United States Patent

[11] 3,626,905

[72] Inventors: Hans Giesbert, Mombris; Walter Fecher, Aschaffenburg; Eberhard Fabian, Kleinkahl; Walter Sauer, Aschaffenburg-Lieder, all of Germany
[21] Appl. No.: 4,276
[22] Filed: Jan. 20, 1970
[45] Patented: Dec. 14, 1971
[73] Assignee: Hans Giesbert Kommandgesellschaft Mombris, Germany
[32] Priority: Jan. 31, 1969
[33] Germany
[31] P 19 38 895.5

[54] REMOVAL OF EGGS FROM TIERED CAGES
3 Claims, 13 Drawing Figs.

[52] U.S. Cl............................................. 119/48
[51] Int. Cl............................................ A01k 31/06, A01k 31/16
[50] Field of Search........................... 119/48; 198/20

[56] References Cited
UNITED STATES PATENTS
| | | | |
|---|---|---|---|
| 2,710,682 | 6/1955 | Coll | 198/20 |
| 2,886,173 | 5/1959 | Scott | 119/48 X |

Primary Examiner—Aldrich F. Medbery
Attorney—Pierce, Scheffler & Parker

ABSTRACT: The present invention provides a solution to the problem of removing eggs from a multitier laying battery composed of a plurality of stacked juxtaposed cages. The floors of the cages are so inclined that eggs lying on the floors roll by gravity to a common plane in each tier level. In each such plane there is a conveyor means for receiving and advancing eggs from the cages of the tier to a common vertical plane from which latter there is spaced a horizontal conveyor. A second conveyor means in one path thereof parallels the aforesaid vertical plane and this second conveyor means is provided with cup-form egg receivers for "grasping" an egg during transport of the egg on said second conveyor means. The apparatus also includes injection means between the second conveyor means and the aforesaid vertical plane for moving eggs into said cups and also ejection means for removing eggs from said cups onto said horizontal conveyor. The several parts of the apparatus may be coated with plastics.

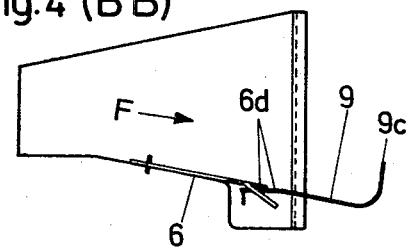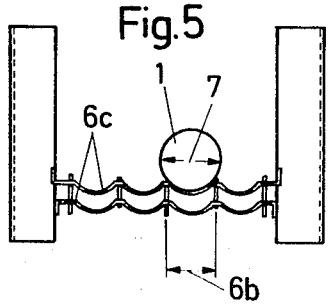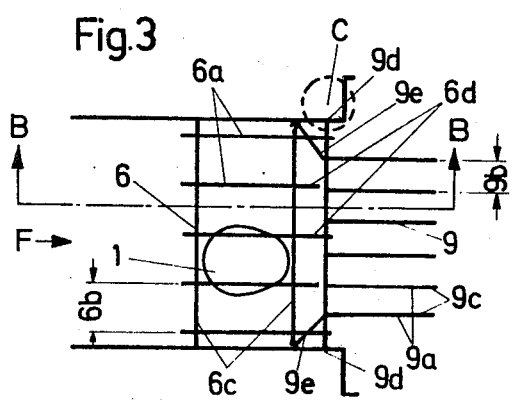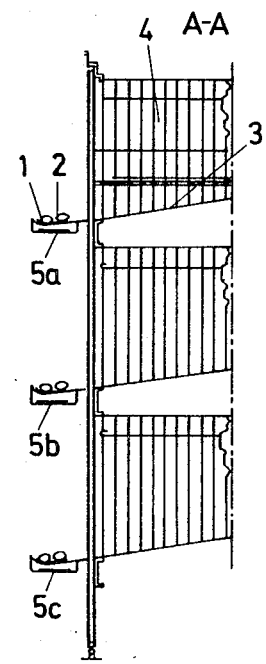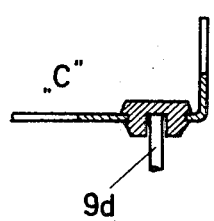

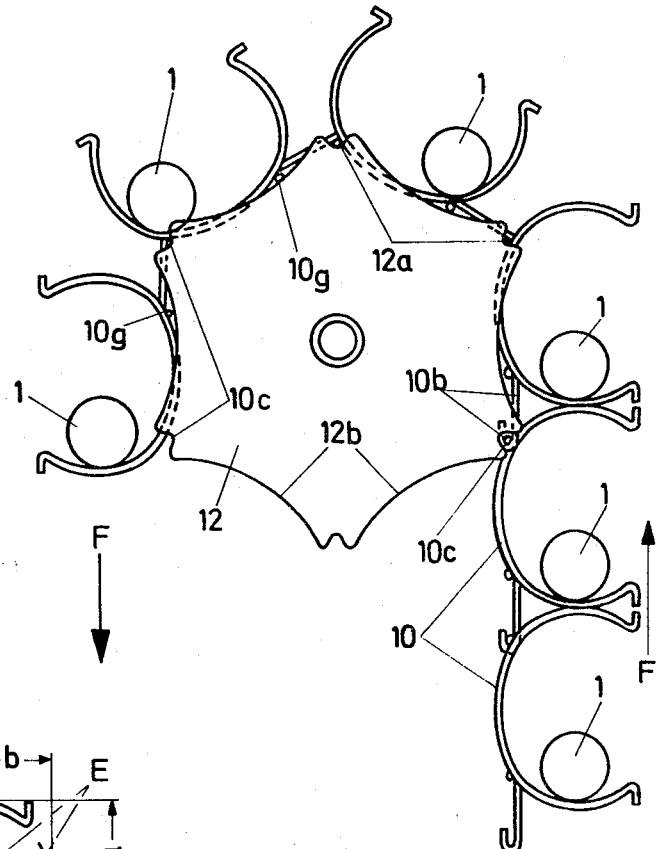
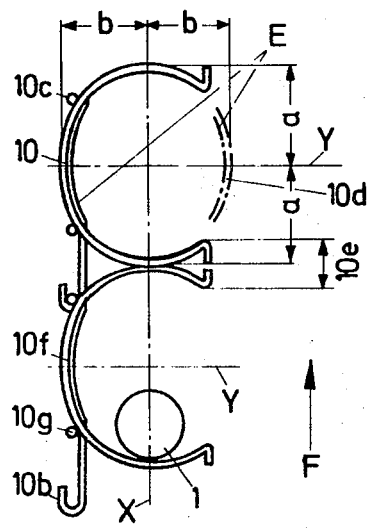
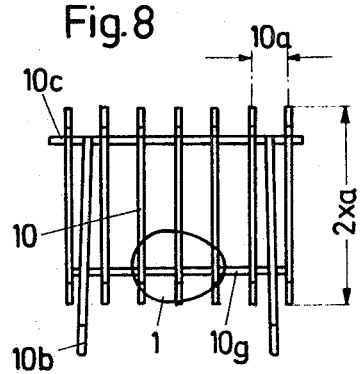

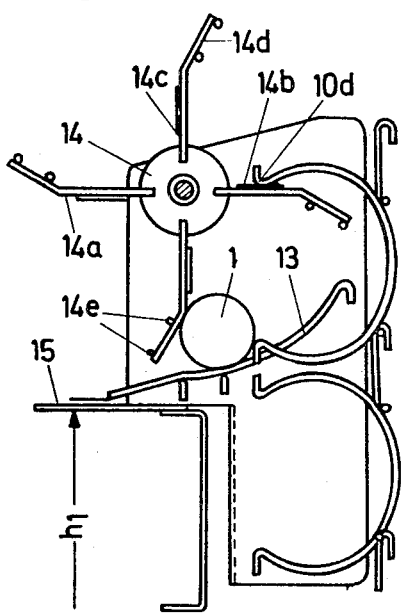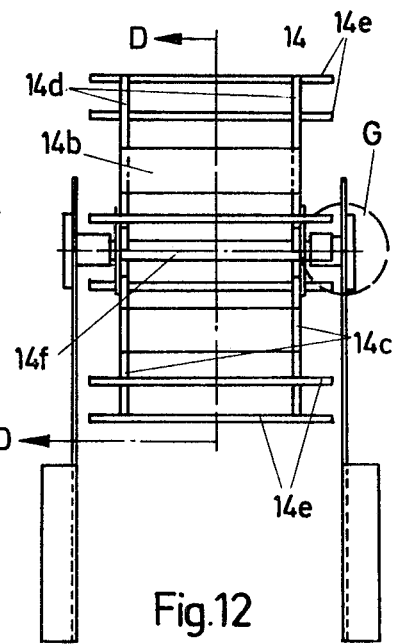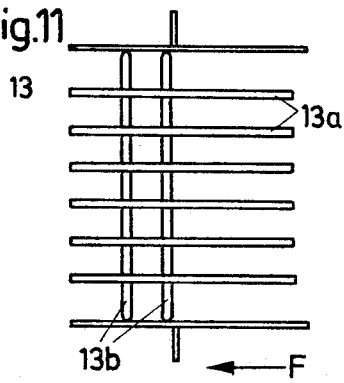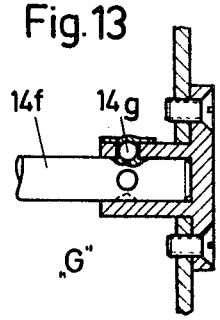

REMOVAL OF EGGS FROM TIERED CAGES

This invention relates to egg conveyors, and is particularly concerned with the provision of apparatus for removing eggs from tiered cages.

The fully automatic collection of eggs has been dealt with in free range farming for a long time in battery poultry farming the only known fully automatic collection of eggs is in the "flat-surface-installations": one-tiered cages placed on the ground. In these one-tier cage installations, the conveying system for the egg collection is on one level, so that no difficulties arise in conveying the eggs to the sorting machine.

In the three and multitiered laying batteries the automatic collection of the eggs is more difficult, since the conveying systems are disposed at several levels in stacked relationship.

The mechanical vertical conveyance of eggs has been especially destructive; consequently, manual handling is most often used to transport eggs from multitier batteries. This is costly in terms of time and labor.

Recent attempts have been made to equip two-tiered cage batteries with egg belts in which the eggs were transported from the upper tier by an elevator having foam rubber pockets open at the upper and lower roller in each case so that the eggs of the upper egg belts fall into the open foam rubber pockets. Once the pockets are beyond the rollers, the closure apparatus automatically entrap the pockets and they are conveyed to lower level. At the lower level, the pockets are again opened and the eggs are displaced on a conveyor belt. In this system though the eggs are carefully transported, the eggs may frequently arrive damaged; the shells often rupture during or prior to fall into the pocket. Moreover, dirt and feathers collect in the foam-rubber pockets making it unsanitary and often fully occupy the egg reception area thereby fouling the system. Cleaning of the pockets is costly. Generally this conveying system is limited to two-tiered cage battery.

Recently, an egg conveyor for three-tiered laying batteries was introduced in which wire conveyors transport the eggs. These conveyors are disposed adjacent to the laying battery and extend over a large curve upwards or downwards, so the eggs are transmitted to the central chain belt. The amount of equipment required is cost-prohibitive and consumes too much space to be feasible.

Accordingly, the problem of finding a method and a suitable arrangement for the purpose of removing eggs from multitiered laying batteries is clearly defined. In particular, a solution is to permit the eggs to be conveyed quickly, safely and economically to an egg collecting belt.

The present invention consists of apparatus for removing eggs from a multitier laying battery comprising a plurality of stacked juxtaposed cages, each of said cages including an inclined floor whereby eggs of said cages are induced by gravity to roll to a common plane in each tier level, conveyor means disposed in each plane adapted to receive and advance eggs from said cages to a common vertical plane, a horizontal conveyor spaced from said vertical plane, second conveyor means one path of which parallels said vertical plane, spaced cups disposed on said second conveyor means adapted to receive and retain said eggs during transport on said second conveyor means, injection means interposed between said second conveyor means and said vertical plane for continuously moving eggs from said spaced positions into said cups and ejection means interposed between second conveyor means and said horizontal conveyor for depositing said eggs from said cups onto said horizontal conveyor.

In accordance with the invention all the wires of the gratings and of the small baskets are preferably coated with plastics.

A further advantageous embodiment of the arrangement consists in that the small wire baskets are also fastened on chains, belts or ropes of metal, textiles, plastics or the like.

Another advantageous embodiment of the arrangement in accordance with the invention consists in that the cups wholly partly consist of shaped parts or even of shaped rods and are made of coated or uncoated metal, plastics including foamed materials, rubber, wood, cardboard or textiles.

Finally a further advantageous embodiment of the arrangement in accordance with the invention also consists in that the small baskets have in cross section a triangular, rectangular or multiangular shape.

The invention will now be described with reference to the accompanying drawings wherein:

FIG. 2 shows a section through FIG. 1 along the line A—A;

FIG. 3 shows a plan view of the soft shelled egg grating as well as of the delivery grating;

FIG. 4 shows a section through FIG. 3 along the line B—B;

FIG. 5 shows corresponding to FIG. 4 a view or insight into the soft shelled egg grating 6 of FIG. 4 without the delivery grating 9;

FIG. 6 shows on a larger scale the detail C corresponding to FIG. 3 in partial section;

FIG. 7 shows as extract from FIG. 1 two small baskets hanging together;

FIG. 8 shows a view or insight into the lower small basket in accordance with FIG. 7;

FIG. 9 shows a side view of a segment disc of the elevator;

FIG. 10 shows the ejector wheel arranged above the receiving grating as well as of the egg collecting belt in a section along the line D—D of FIG. 12;

FIG. 11 shows a plan view of the egg receiving grating,

FIG. 12 shows a view of the ejector wheel as seen from the left side of FIG. 10; and FIG. 13 shows on an enlarged scale the detail G corresponding to FIG. 12 in view or partial section.

Figure 1:
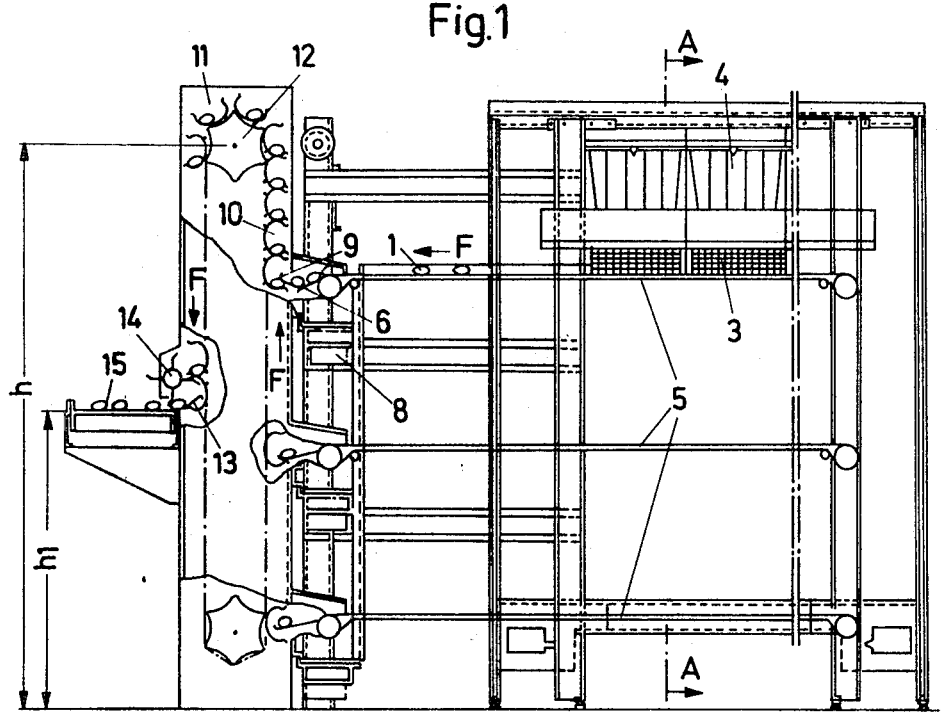
FIG. 1 shows in partial cross section a side view of the arrangement in accordance with the invention.

Referring to FIG. 1, a plurality of juxtaposed cages 4 are arranged in multitier stacked relation to form the laying battery configuration of the present invention. Each cage 4 includes an inclined floor 3 which projects outwardly from one end of the cage and terminates in an upturned edge 2. The juxtaposed edges 2 are aligned to form a contiguous collection trough for eggs 1 which roll or are otherwise induced by gravity to migrate to the lowest point on the inclined floor.

In the illustrated embodiment, three tiers of juxtaposed cages are disclosed, each of which includes a horizontally disposed conveyor belt $5a$, $5b$, $5c$, which passes beneath the tier trough 2. Suitable apertures or other means permit the eggs to pass onto the moving conveyor for transport from the cages. It should be appreciated that any conventional means may be provided to deposit the eggs on the conveyor in order to avoid breakage of the egg shells.

Each of the conveyors transports the eggs to point of removal, i.e., an upstanding brace whereby the eggs are disposed at spaced intervals in a common vertical plane.

In both of the preceding and in the corresponding following figures the direction of conveying is in each case designated by the letter F.

In FIG. 3 the egg grating 6 is shown together with the delivery grating 9. It is essential that the distance $6b$ between the wires $6a$ of the egg grating with its two cross braces $6c$ is somewhat less than the transverse diameter 7 of an egg, cf. also FIG. 5, so that dirt, dust and feathers can fall into a collecting bin 8 disposed on the brace.

The most suitable distance apart $6b$ of the wires $6a$ of the soft shelled egg grating 6 has been found to be approximately 32 mm. (±1 mm.), while the usual transverse diameter 7 of an egg is approximately 42–44 mm.

The delivery grating 9 is provided with wires $9a$, spaced a distance $9b$ which is considerably less than the distance between the wires $6a$ of the egg grating; accordingly, undamaged eggs pass to the delivery grating 9 without difficulty. The delivery grating 9 is provided with cross braces $9d$, on both sides of the construction and pivotably arranged to permit rotational movement about a horizontal axis, see detail C in FIG. 3 or FIG. 6.

The wires $9a$ are secured to cross braces $9d$ and the two outermost wires $9a$ are bent to the side construction and in the working position the extension $9e$ projects under cross braces $6c$ to receive and convey eggs on grating 6.

As seen in FIG. 4 egg grating 6, is aligned obliquely, with adjoining delivery grating 9. The latter includes flared ends 9c, which cradles the egg received therein for subsequent injection into cups 10 as will be described hereinafter. If a cup is already occupied the delivery grating 9 is displaced by rotation about the cross brace 9d. In FIG. 4 there can also be seen the outer ends 6d of the egg grating wires 6a reaching almost right up to the cross braces 9d to insure proper transfer of the eggs.

As shown in FIG. 5 the wavelike formation of the cross braces 6c of the egg grating 6 cradles the eggs and are spaced a distance 6b.

FIG. 6 shows on an enlarged scale the detail C from FIG. 3, particularly the seating of the linkedly mounted cross brace 9d of the delivery grating 9 in the side construction.

In FIG. 7 there are represented as extract from FIG. 1 two cups 10 of elevator 11 arranged one on top of the other. These small baskets preferably consist of plastics coated wires as is the case with the other gratings. The cups define a C-shaped opening outwardly comprising spaced wires 10a (cf. also FIG. 8). The cup form as seen in cross section, an ellipse E in which "a" (the longer half-axis): "b" (shorter half-axis) in a proportion of approximately 50:40 mm. Consequently the cups define a closed side 10f and an open side 10d lying opposite this side.

The individual wires of the pockets are parallelly disposed and bent round upwardly and downwardly to form the ellipse; in each case two cups form an outer surface 10e as the spacing between cups.

The cups possess at the closed side 10f downwardly projecting hooks 10b; which engages projects 10c of the next succeeding cup disposed on the upper portion of side 10f. The lower cross braces 10g stabilize the cup construction. Thus arranged, the pivotally interconnected cups define an elevator 11 for receiving eggs.

The elevator 11 with the height "h" of interconnected cups 10 is entrained about a pair of rotatably-mounted, vertically spaced discs 12 aligned on shafts disposed in a common vertical plane.

The discs 12 are of hexagonal configuration having inwardly bent corners 12a. The angular spacing between corners 12a is equal to the linear dimension between projections 10c on the cups and the latter are received in the corners 12a to transmit movement to the elevator. For constructional reasons the hexagonal surfaces 12b of the disc are provided with a slight inward curvature corresponding to the elliptical shape of the cups. This configuration actually cradles the eggs in the cups during movement of the latter thereover.

AT any given height "h," a horizontal conveyor 15 is disposed adjacent the elevator comprising the cups 10 on the side opposite the upstanding brace. The conveyor 15 is adapted to receive any convey eggs deposited thereon from the cups 10.

Spaced above the conveyor 15 is a driven shaft 14 with wings and sails, respectively, 14a having angularly spaced flaps 14c with carrier sheets 14b and also projections 14d with cross-braces 14e adapted to extend into the cups 10 and engage the egg from each for ejection onto conveyor 15. An arcuate guide 13 suitably secured adjacent the conveyor 15 extends into the cups as they progress past and lift the egg upwardly to assist in ejection. Projection 14d contacts the eggs and advances along the guide 13 which cushions movement of the egg onto conveyor 15. The guide 13 has wires 13a connected by U-shaped cross-braces 13b, - see FIG. 11. The rotation of shaft 14 and consequently flaps 14c is effected by, and in timed relation to, the linear movement of the cup elevator. Accordingly, projections 14d with cross-braces 14e are aligned with each cup as it moves into alignment with guide 13 and thus each cup undergoes ejection of its egg onto conveyor 15.

Detail G of FIG. 12 is shown in detail in FIG. 13. The ball catch 14g is either mounted on one or both sides of the shaft 14f on the outermost end. The ball catch consists of a spring-biased ball, which locks in a corresponding hemispherical recess formed in the shaft. The ball catch prevents the following flap of the ejector wheel arriving in the zone of the conveyor small basket unintentionally and too early.

I claim:

1. Apparatus for removing eggs from a multitier laying battery, comprising
   a plurality of stacked juxtaposed cages;
   each of said cages including an inclined floor whereby eggs in said cages are induced by gravity to roll to a common plane in each tier level;
   conveyor means disposed in each plane adapted to receive and advance eggs from said cages to a common vertical plane;
   a horizontal conveyor spaced from conveyor vertical plane;
   elevator means one path of which parallels said vertical plane, said elevator means comprising (a) a pair of spaced rotatable hexagonal discs having inwardly bent corners, and (b) a belt entrained about said discs comprising a plurality of interconnected C-shaped cups, each cup including projections extending transversely on opposite sides thereof, the longitudinal spacing of said projections being equal to the angular spacing of said inwardly bent corners, said projections being received in said bent corners to define said elevator means;
   said cups disposed on said elevator means being shaped to receive and retain said eggs during transport on said elevator means,
   injection means interposed between said elevator means and said vertical plane for continuously moving eggs from said spaced positions into said cups; and
   ejection means interposed between said elevator means and said horizontal conveyor for depositing said eggs from said cups onto said horizontal conveyor.

2. Apparatus for removing eggs from a multitier laying battery, comprising
   a plurality of stacked juxtaposed cages,
   each of said cages including an inclined floor whereby eggs in said cages are induced by gravity to roll to a common place in each tier level,
   conveyor means disposed in each plane adapted to receive and advance eggs from said cages to a common vertical plane,
   a horizontal conveyor spaced from said vertical plane,
   elevator means one path of which parallels said vertical plane,
   spaced cups disposed on said elevator means adapted to receive and retains said eggs during transport on said elevator means,
   injection means interposed between said elevator means and said vertical plane for continuously moving eggs from said spaced positions into said cups, said injections means comprising a plurality of spaced wire gratings rotatably mounted adjacent said vertical plane and adapted to receive eggs in each tier, said grating including a flared edge adapted to extend into said spaced cups whereby when any said cup is occupied the egg is precluded by said flared edge from entering said cup; and
   ejection means interposed between said elevator means and said horizontal conveyor for depositing said eggs from said cups onto said horizontal conveyor.

3. Apparatus for removing eggs from a multitier laying battery, comprising
   a plurality of stacked juxtaposed cages,
   each of said cages including an inclined floor whereby eggs in said cages are induced by gravity to roll to a common plane in each tier level,
   conveyor means disposed in each plane adapted to receive and advance eggs from said cages to a common vertical plane,
   a horizontal conveyor spaced from said vertical plane,
   elevator means one path of which parallels said vertical plane,
   spaced cups disposed on said elevator means adapted to receive and retain said eggs during transport on said elevator means, injection means interposed between said elevator means and said vertical plane for continuously moving eggs from said spaced positions into said cups; and ejection means interposed between said elevator means and said horizontal conveyor for depositing said eggs from said cups onto said horizontal conveyor, said ejection means comprising a rotatable shaft disposed adjacent said horizontal conveyor, said shaft including angularly spaced flaps adapted to project into said spaced cups, said elevator means and said shaft being driven in timed relation whereby said flaps with their carrier sheets and their cross braces continuously eject said eggs from said cups onto said horizontal conveyor.

* * * * *

UNITED STATES PATENT OFFICE
CERTIFICATE OF CORRECTION

Patent No. 3,626,905   Dated December 14, 1971

Inventor(s) Hans Giesbert et al.

It is certified that error appears in the above-identified patent and that said Letters Patent are hereby corrected as shown below:

Claim 1, line 10 "conveyor", second occurrence, should read -- said --. Claim 2, line 6, "place" should read -- plane --; line 14, "retains" should read -- retain --; line 18, "injections" should read -- injection --.

Signed and sealed this 13th day of June 1972.

(SEAL)
Attest:

EDWARD M. FLETCHER, JR.
Attesting Officer

ROBERT GOTTSCHALK
Commissioner of Patents